Sept. 29, 1931.    E. M. COPP    1,824,875
SUGAR CANE PROCESS AND APPARATUS
Filed Nov. 22, 1928
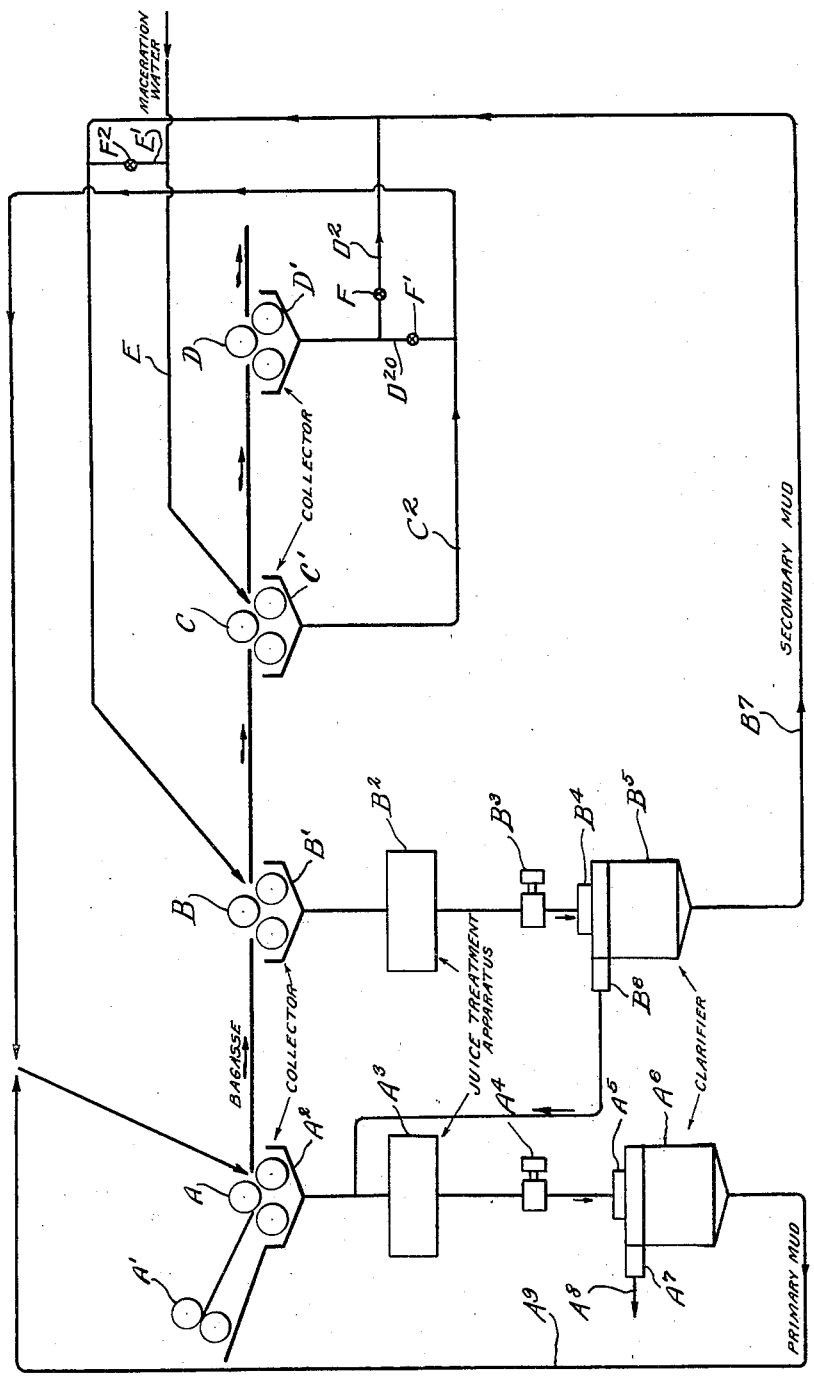
INVENTOR
EARLE M. COPP
BY
John E. Hubbell
ATTORNEY

UNITED STATES PATENT OFFICE

EARLE M. COPP, OF SAN JUAN, PORTO RICO, ASSIGNOR TO PETREE & DORR ENGINEERS, INC., OF NEW YORK, N. Y., A CORPORATION OF CUBA

SUGAR CANE PROCESS AND APPARATUS

Application filed November 22, 1928. Serial No. 321,066.

The present invention relates to the extraction of sugar juice from the sugar cane by successively crushing and macerating the sugar cane. The general object of my present invention is to provide an improved method of and apparatus for extracting and treating sugar cane juice which are characterized by the effective utilization and disposition of the sediment or mud containing sucrose separated in the treating process. More specifically, my invention comprises a novel method of and apparatus for treating the "rich" and "poor" sugar juices collected, respectively, from the primary and secondary sections of a sugar cane milling circuit, characterized by the separate clarification of the "rich" and "poor" juices and the separate return of the "rich" and "poor" muds separated from the "rich" and "poor" juices, respectively, to the bagasse at suitable points in the milling circuit. Each of the muds may be returned to the bagasse alone, or in admixture with raw juice from a section subsequent to that at which the mixture is added to the bagasse, or with water.

The various features of novelty which characterize my invention are pointed out with particularity in the claims annexed to and forming a part of this specification. For a better understanding of the invention, however, and the advantages possessed by it, reference should be had to the accompanying drawing and descriptive matter in which I have illustrated and described a preferred embodiment of the invention.

The accompanying drawing is a diagrammatic representation of apparatus employed in a preferred mode of practicing the invention.

The apparatus diagrammatically shown includes a four mill crushing plant comprising a primary mill A, a secondary mill B, and third and fourth mills C and D, respectively. Sugar cane is passed from crusher rolls A′ through the various mills in the order mentioned. In the system illustrated, the rich juice is collected from the crusher and from the first mill by a collector $A^2$, from which it passes to treatment apparatus $A^3$, where, after screening, the juice is subjected to a chemical action or to a heating action, or preferably in most cases to both actions, to coagulate albuminoids and to give the proper acidity or alkalinity to the clarified juice separated from the mud in the clarifier $A^6$ to which the juices are passed by a pump $A^4$ through the inlet or feed chamber $A^5$. The rich juice clarifier $A^6$ may be a Dorr clarifier or of other suitable type, and is provided with a clear juice outlet or collecting chamber $A^7$ from which the clarified juice passes away through the conduit pipe $A^8$ to the concentration apparatus. The mud separated from the juice in the clarifier $A^6$ is passed from the bottom of the latter through a conduit $A^9$ to a point adjacent the discharge end of the mill A where it is mixed with the thin raw juice from the third mill C and added to the bagasse as will be described hereafter.

Substantially the same sequence of operations take place in the second milling section B, where the juice is collected in a collector B′, passed to juice treatment apparatus $B^2$ wherein similar operations take place as in the treatment apparatus $A^3$ and from which the juice is transferred by the pump $B^3$ to the inlet chamber $B^4$ of a clarifier $B^5$. The clarified juice from the clarifier $B^5$ passes out through the clear juice outlet $B^6$ to the rich juice circuit at a point prior to the treatment apparatus $A^3$, wherein it is subjected to the same treatment as is the rich juice, and passes with the latter to the clarifier $A^6$ through the inlet or feed chamber $A^5$. The secondary mud separated from the juice in the clarifier $B^5$ passes from the bottom of the latter through a conduit $B^7$ to a point subsequent to the secondary mill B. During the passage of the secondary mud from the clarifier the mud is mixed with the raw juice from the fourth mill D, or with water, and the mixture is added to the bagasse from the second mill at a point adjacent the discharge end of the mill B.

In the third and fourth stages of the milling circuit the thin raw juice is collected from the mills C and D by collectors C′ and D', respectively. Immediately after leaving the third mill C, the bagasse is treated with a maceration liquid which in the system shown may be clear sweet water passed through the conduit E. The thin juice collected from the mills C and D may be conveyed away from the latter through the conduits $C^2$ and $D^2$ respectively, and mixed with the primary and secondary muds respectively. The respective mixtures are added to the bagasse at different points in the milling circuit as shown.

For the mode of operation just described, the valve F in the conduit $D^2$ is open and the valve $F^1$ in a conduit branch $D^{20}$ is closed. In an alternative mode of operation, the valve F is closed, and the valve F' is open to permit the juice from the collector D' to pass into the conduit $C^2$, in which case the mill sections C and D collectively constitute the third mill section. When the milling circuit does not include a fourth mill section, either as a result of the actual omission of the mill section parts D, or of the use just described of those parts in conjunction with the mill section parts C to form in effect the third mill section of the milling circuit, water is advantageously added to the secondary mud, as by means of the conduit connection E' between the maceration water supply conduit E and the conduit $B^7$. In the mode of operation contemplated with the apparatus shown in which the valve F is open and the valve F' is closed, the valve $F^2$ in the conduit branch E' is also closed.

The present invention is especially advantageous in that it results in a more uniform distribution of the mud in the system to the bagasse and a more equal distribution of the load on the apparatus in the primary and secondary sections. The application of the primary mud to the bagasse after the first mill is advantageous in that the greater portion of the insoluble constituents will be retained in the bagasse while passing through the second mill and will be carried to the furnace. The arrangement of the apparatus disclosed is advantageous in that the separate treatment and clarification of the "rich" and "poor" juices provides a more equal distribution of the load on the pumps and clarifiers than in installations wherein the primary mud is mixed with the secondary juice and passed through the clarifier in the secondary mill circuit. By mixing the thin juice from the third mill with the primary mud, any disadvantage from adding an unduly rich mud to the bagasse is avoided. The two stage application of the mud results in a lesser portion of the mud coming to the third mill as free mud, which is mud not adhering to the bagasse, with consequent less reexpression of the mud from the bagasse at the third mill. A further advantage of the present system is that each mud is in the treatment process a minimum amount of time.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The method of extracting sugar cane juice from sugar cane which consists in successively crushing the sugar cane in primary and secondary mill sections, separately defecating the extracted juice from the primary and secondary mill sections, returning the defecation mud from the primary circuit to the bagasse at a point subsequent to the primary mill section, and returning the defecation mud from the secondary mill section to the bagasse at a point subsequent to the secondary mill section.

2. The method of extracting sugar cane juice from sugar cane which consists in successively crushing and macerating sugar cane in a multiple mill circuit, separately defecating the extracted juice from the primary and secondary mill sections, mixing the defecation mud from the primary mill circuit with the juice from a mill section subsequent to the secondary mill section and returning the mixture to the bagasse at a point adjacent the discharge end of the primary mill section, and mixing the secondary mud with the juice from a subsequent mill section and returning the mixture to the bagasse at a point adjacent the exit end of the secondary mill section.

3. The method of extracting sugar cane juice from sugar cane which comprises successively passing the sugar cane through a plurality of crushing mill sections, separately treating and clarifying the extracted juice from the primary and secondary mill sections, returning the primary defecation mud directly to the bagasse between the primary and secondary mill sections, and separately returning the secondary defecation mud to the bagasse at a point subsequent to the secondary mill section.

4. The method of extracting sugar cane juice from sugar cane which comprises successively passing the sugar cane through a plurality of crushing mill sections, separately defecating the extracted juice from the primary and secondary mill sections, passing the secondary clear juice to the primary raw juice line, mixing the primary defecation mud with raw juice from a mill section subsequent to the secondary mill section, returning the attenuated primary defecation mud directly to the bagasse at a point between the primary and secondary mill sections, and returning the secondary defecation mud to the bagasse at a point subsequent to the secondary mill section.

Signed at San Juan, in the district of San Juan and Territory of Porto Rico, this 13th day of November A. D. 1928.

EARLE M. COPP.